Jan. 31, 1950
W. E. BRADLEY
2,495,690
ECHO-TRIGGERED RADAR SYSTEM
Filed Jan. 27, 1945
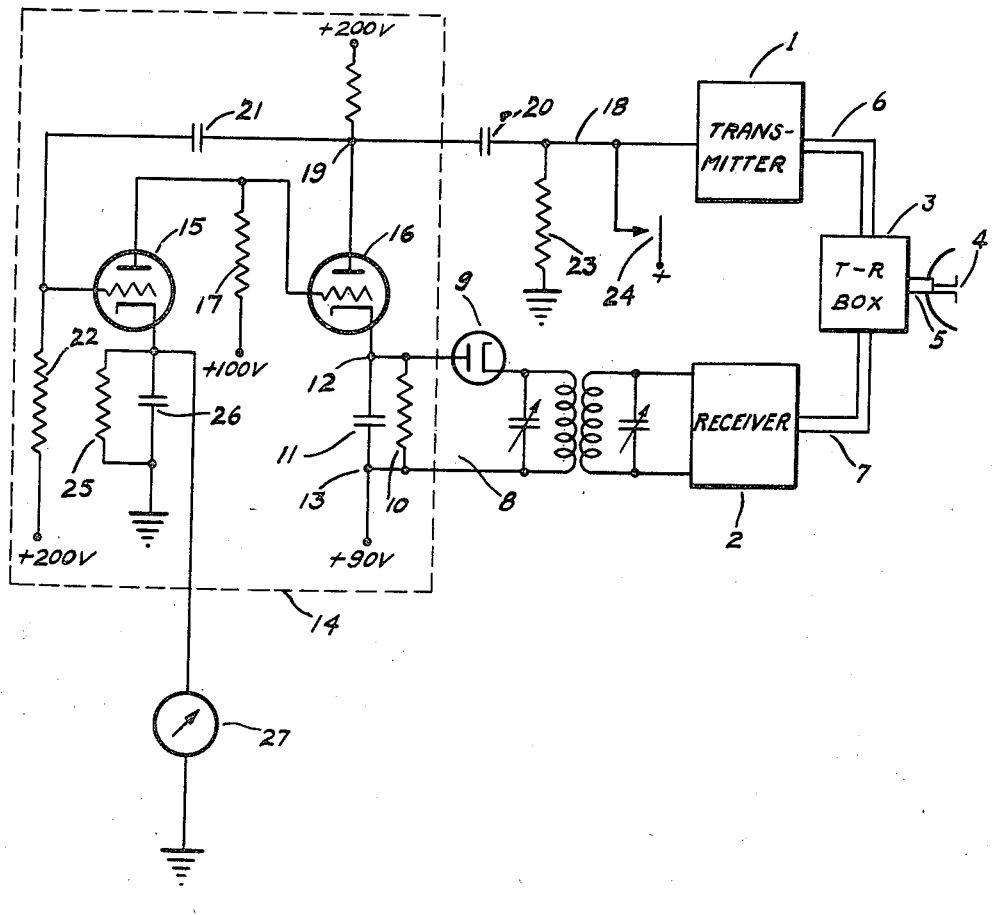
INVENTOR.
WILLIAM E BRADLEY
BY
Crosby Gauthier
his attorney Patented Jan. 31, 1950

2,495,690

UNITED STATES PATENT OFFICE 2,495,690

ECHO-TRIGGERED RADAR SYSTEM

William E. Bradley, Swarthmore, Pa., assignor, by mesne assignments, to Philco Corporation, Philadelphia, Pa., a corporation of Pennsylvania Application January 27, 1945, Serial No. 574,912

1 Claim. (Cl. 343—13)

This invention has to do with radio detecting and ranging devices and is capable of being employed, among other things, as a radar device, in the usual sense, and as an absolute altimeter for use on aircraft.

One of the objects is to provide a simplified, low-cost radar system which, though not adequate to meet all military needs, will serve to detect the presence and proximity of wave-reflecting objects and can, for example, be usefully employed as a device to warn of invisible obstacles in the way of railroad trains or as a marine crash warning device.

Another object is to provide an absolute altimeter—more especially for aircraft use—which is less bulky and less costly, and at least as satisfactory in all respects as the best previously known devices of that character.

The system herein described is a preferred embodiment of the invention and comprises, in combination, a radio transmitter and receiver together with a novel transmitter triggering circuit which, upon receipt of an echo, (i. e., a reflected signal) serves to activate the transmitter—but only after the lapse of a predetermined period of time. The proximity of the nearest reflecting object is determined as a function of the time required for a signal wave to travel to and return from said object—as is true of all radar systems.

A feature which particularly characterizes this invention and enables it to afford reliable indications of the proximity of reflecting objects is a provision whereby the first echo of each outgoing signal serves to render the system wholly unresponsive to any additional echoes of the same signal coming from more remote reflecting objects and, therefore, later in time. In each instance the first echo to return conditions the triggering circuit so that it will operate automatically to again trigger the transmitter following a predetermined short period of time—which period is long enough to allow for the return of all subsequent echoes of the same outgoing signal which could be of sufficient signal strength to activate the transmitter and thus impair the accuracy of the device.

The single figure of the drawing shows a circuit diagram of an embodiment of my invention.

In the circuit diagram a radio transmitter 1 and radio receiver 2 are connected through a so-called T-R box 3 to a directional antenna 4. The T-R box is a unit commonly employed in radar systems, and its functions are to protect the receiver against powerful outgoing signal waves, which would otherwise impinge directly upon the receiver, and to facilitate transmission of received waves from the antenna to the receiver without any impediment which might otherwise result from the transmitter output connections to the antenna. Since the T-R unit is something well known to those skilled in the art, it seems unnecessary to describe it in further detail.

The transmitter may be of conventional design; but for radar and altimeter work it usually is preferable to employ a very high or ultra high frequency. The oscillation generator of the transmitter is normally biased below cut-off, as by the application of a high negative bias to the control grid. The oscillation generator is, consequently, inoperative until the fixed negative bias is overcome, as by the application of a positive pulse of sufficient amplitude to its control grid. The receiver is tuned to respond to the frequency of the outgoing signal waves and may be of the superheterodyne type. The connections at 5, 6, and 7 generally consist of co-axial lines or wave guides; but that is not necessarily the case.

Coupled to the output of the intermediate frequency amplifier of receiver 2 is a detector circuit 8 including a diode 9 in series with a load resistor 10, which is shunted by a capacitor 11. The diode is so connected that the D. C. potential produced by rectifying a received signal renders point 12 more negative than point 13.

That part of the system shown within the dash-line rectangle 14 may conveniently be referred to as the trigger circuit. Its function is to trigger the transmitter in response to a received signal; that is to say, in response to the first-returning echo of each signal put out by the transmitter. But the trigger circuit has a further and very important function, namely: to delay the triggering of the transmitter following receipt of the first echo for a period which, though short, is of sufficient duration to render the system unresponsive to any echo of a given outgoing signal which is subsequent in time to the first-received echo of said given signal. In this connection it may be helpful to point out that in using the device the operator is concerned with determining the proximity of the nearest reflecting object in the path of the transmitted beam, and that to permit echoes from more remote reflectors to activate the transmitter would render the device quite useless, except in those cases where there is only one reflecting object from which an echo could be received.

The transmitter is designed to be triggered in response to a positive pulse applied to conductor 18; and the function of the trigger circuit is to produce such a pulse in response to an incoming signal; but only after the lapse of a predetermined period of time following receipt of said incoming signal. The predetermined period of time may, for example, be 1000 microseconds. Such being the case, the transmitter will send out a signal 1000 microseconds after an incoming signal has been received; but it will not respond at all to any incoming signal (echo or otherwise) which may arrive during the aforesaid 1000 microsecond period.

The particular trigger circuit which I have chosen to illustrate, and which is thought to be novel in itself, comprises two triodes 15 and 16 respectively. Approximate applied voltages are indicated on the diagram, from which it can easily be seen that plate current normally flows through triode 15, whereas triode 16 is biased below cut-off.

According to the voltages indicated on the diagram, the normal potential at point 19 is +200 volts. Upon receipt of an incoming signal (i. e., the first echo) the potential at point 12 becomes more negative, thus rendering the grid of triode 16 more positive and causing plate current to flow through triode 16. This brings about an instantaneous decrease of potential at point 19—which is transmitted through capacitor 20 to conductor 18, but has no effect on the transmitter, since the latter is not responsive to negative pulses.

The decrease of potential at point 19 is also transmitted through capacitor 21 to the grid of triode 15, rendering the latter so negative that the plate current through triode 15 is instantly cut off. This causes the grid of triode 16 to become more positive, thereby simply increasing the plate current through triode 16 and further decreasing the potential at point 19—which also has no effect on the transmitter.

The grid of triode 15 remains below cut-off for a prescribed period of time which, as previously suggested, may be 1000 microseconds; and this is accomplished by selecting suitable values for capacitor 21 and leak resistor 22. Since the charge on capacitor 21 leaks off principally by way of resistor 22, it will be apparent that the time constant is determined by the values of those parameters.

As soon as the potential on the grid of triode 15 has returned to a value above cut-off, as a result of the discharge of capacitor 21, plate current will flow through triode 15 and the grid of triode 16 will consequently become sufficiently negative to interrupt the flow of plate current through triode 16. This causes point 19 to become more positive; and the potential at that point rises sharply by virtue of inter-tube regeneration.

The positive pulse thus produced at point 19 is transmitted via capacitor 20 to conductor 18 and thence to the transmitter where it causes a signal wave of very short duration to be transmitted.

Each outgoing signal wave should ordinarily be of such short duration, that the transmitter is cut off before the wave has time to travel to and return from a reflecting object situated at some predetermined distance. This means that the duration of each outgoing signal may be of the order of one or two microseconds or even a fraction of a microsecond.

Obviously, the rate of decay of each positive pulse appearing on conductor 18 depends upon the value of resistor 23; and that, of course, may be utilized to determine the duration of each individual outgoing signal.

Operation of the system is started either as a result of picking up some random signal or in some way stimulating the transmitter as, for example, by means of a vibrating contact 24 which periodically applies a positive pulse to conductor 18. In like manner, the receiver could be artificially stimulated instead of the transmitter.

Assuming that an outgoing signal is so directed that it finds a reflecting object within range of the system, the signal will be reflected back and picked up by the receiver. This causes the trigger circuit to be actuated as previously described, as a result of the potential at junction 12 being made more negative. Then, following a lapse of 1000 microseconds, or whatever period of time may have been decided upon, the transmitter is again triggered. This process repeats itself indefinitely as long as the outgoing signals continue to be reflected back with sufficient strength to actuate the trigger circuit. Assuming that the time constant of the trigger circuit is 1000 microseconds, the period of any given cycle is 1000 microseconds plus the time required for a signal wave to reach the nearest reflecting object and the echo to return. Any additional echoes coming in from more distant reflecting objects are completely innocuous because the trigger circuit will not respond to any such echo within the aforementioned period of 1000 microseconds—and that is more than sufficient time to allow for the return of echoes from the most distant reflecting objects within range of the receiver.

Since in each instance the problem is to measure the proximity of the nearest wave-reflecting object, the solution lies in producing an indication which is proportional to the time required for a wave to travel from the transmitter to the nearest reflecting object and return to the receiver; and it will be observed that this period of time is, in each case, identical, or substantially so, with the co-instant period during which space current is flowing through triode 15. Consequently, the average D. C. voltage across cathode resistor 25 and by-pass capacitor 26, during a period of time when the transmitter is operating cyclically and outgoing waves are being reflected back repeatedly, as described above, affords a reliable measure of the distance away of the nearest reflecting object. A D. C. voltmeter 27 arranged to respond to the voltage across condenser 26 may be calibrated to read directly in terms of distance. The parallel combination comprising resistor 25 and capacitor 26 has, preferably, a long time constant.

Any competent radio engineer will be able to compute or otherwise determine suitable values for the several capacitors and resistors and, likewise, determine optimum voltages. The voltages given should be regarded as purely suggestive.

When employing the herein-described system as an absolute altimeter, the antenna reflector would, of course, be directed toward the earth; but it may be dirigible to enable the pilot to detect obstacles ahead.

Although the trigger circuit herein described is thought to be novel and inventive in itself; it should be understood that the scope of the invention, as respects the system as a whole, is not limited to any specific means for performing the delayed triggering operation.

What is claimed is:

A radio detecting and ranging system comprising, in combination; a normally inactive carrier-wave transmitter for transmitting pulses of radio-frequency energy; a carrier-wave receiver adapted to receive echoes of said transmitted pulses; starting means for effecting the transmission by said transmitter of an initial pulse of radio-frequency energy; a delayed-impulse generator connected to said receiver and responsive to the reception by said receiver of the first echo of said initially transmitted pulse for generating a delayed electrical impulse, said delayed impulse being generated after the lapse of a predetermined period of time following reception of said first echo, said predetermined period of time being greater than the time interval which would occur between the transmission of a pulse and the reception of an echo thereof from a reflecting object located at the range limit of the system; means rendering said delayed-impulse generator unresponsive to echoes received by said receiver during said predetermined period of time following reception of said first echo; means for applying said delayed impulse to said transmitter to effect the transmission of a second pulse of radio-frequency energy, whereby the first echo of said second pulse, when received by said receiver, actuates said delayed-impulse generator, said system thereafter being self excited, the interpulse periods being equal to the time intervals between the transmission of a pulse and the reception of the first echo thereof plus said predetermined period of delay time; means for developing a voltage proportional to the pulse-repetition frequency; and means for utilizing said developed voltage to indicate the distance from the transmitter to the nearest reflecting object.

WILLIAM E. BRADLEY.

REFERENCES CITED

The following references are of record in the file of this patent:

UNITED STATES PATENTS

| Number | Name | Date |
| --- | --- | --- |
| 1,945,952 | Nicolson | Feb. 6, 1934 |
| 2,050,059 | Koch | Aug. 4, 1936 |
| 2,134,716 | Gunn | Nov. 1, 1938 |
| 2,211,942 | White | Aug. 20, 1940 |
| 2,262,838 | Deloraine et al. | Nov. 18, 1941 |
| 2,333,688 | Shepard, Jr. | Nov. 9, 1943 |
| 2,354,930 | Stratton | Aug. 1, 1944 |
| 2,400,309 | Kock | May 14, 1946 |
| 2,404,527 | Potapenko | July 23, 1946 |
| 2,421,016 | Deloraine et al. | May 27, 1947 |
| 2,421,018 | De Rosa | May 27, 1947 |

FOREIGN PATENTS

| Number | Country | Date |
| --- | --- | --- |
| 469,417 | Great Britain | July 26, 1937 |
| 474,690 | Great Britain | Nov. 5, 1937 |